J. H. BLAIR.
MOWER.
APPLICATION FILED APR. 18, 1918.
1,383,066.
Patented June 28, 1921.
2 SHEETS—SHEET 1.
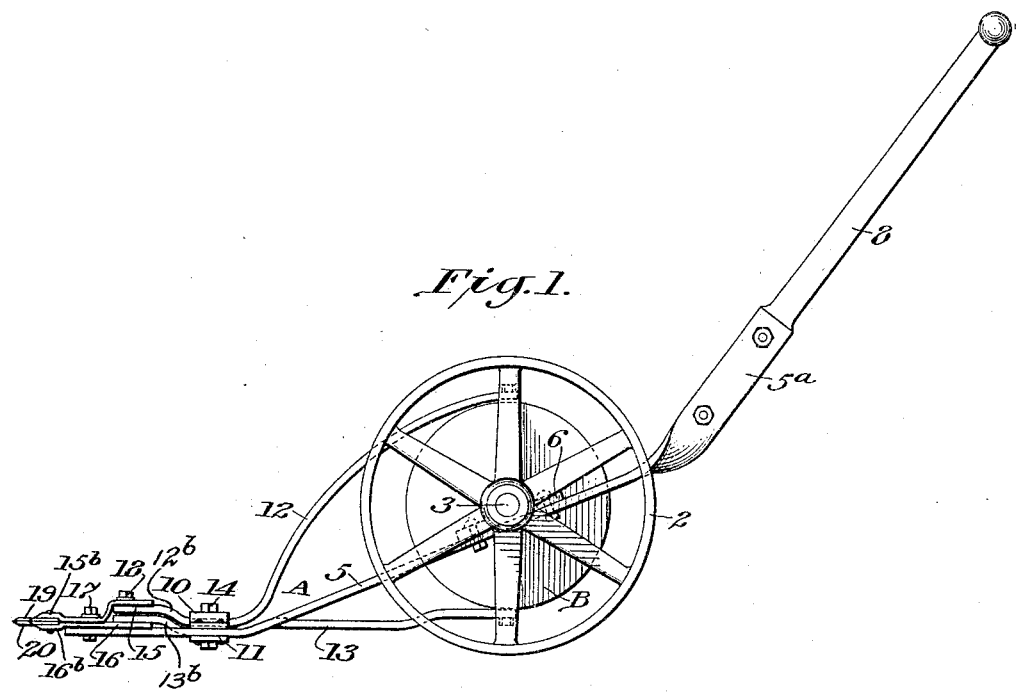
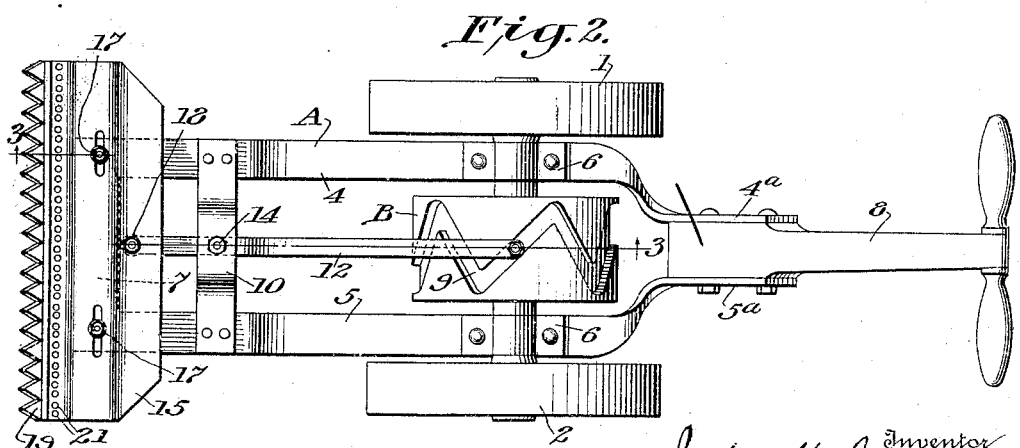

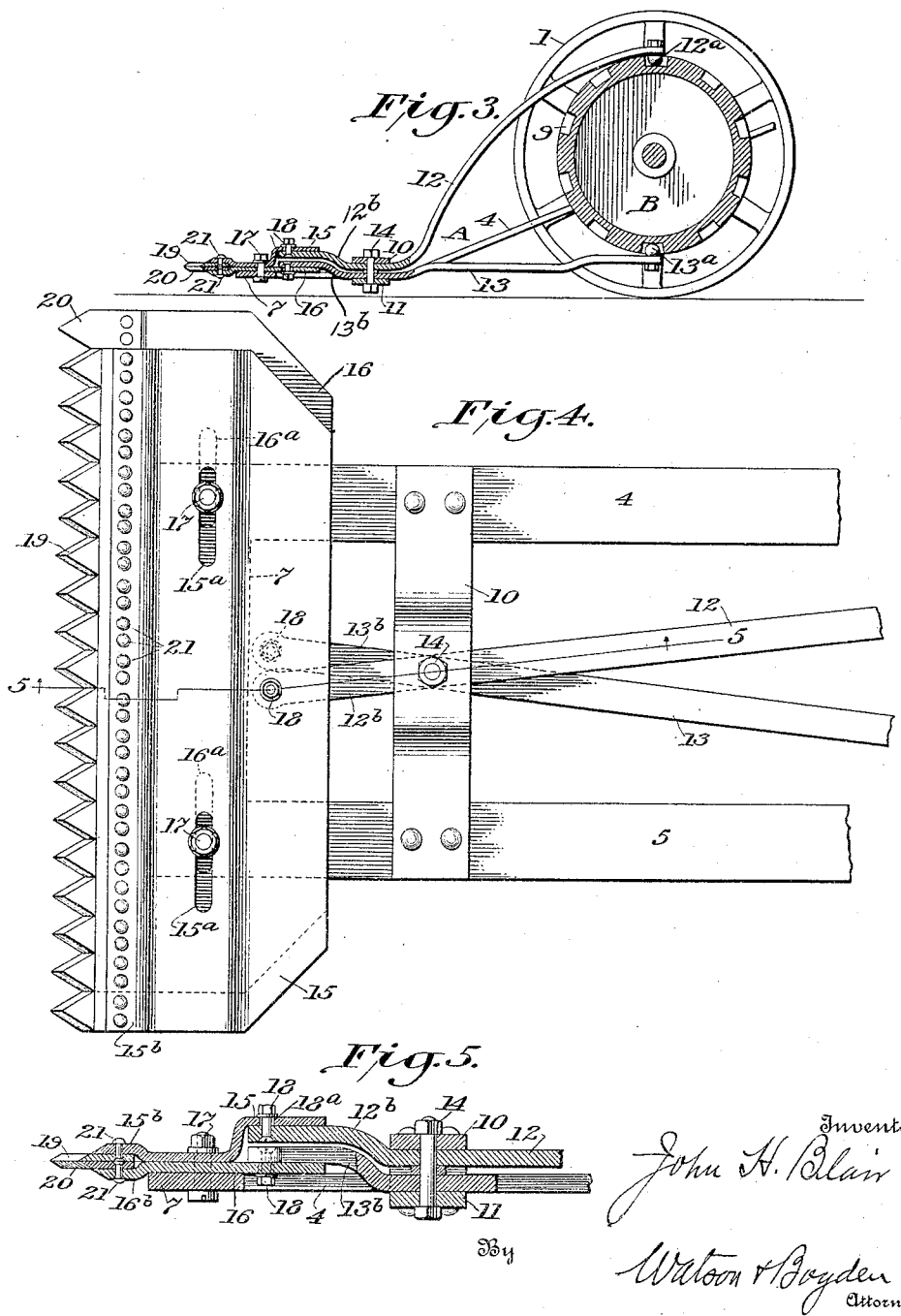

UNITED STATES PATENT OFFICE.

JOHN HENRY BLAIR, OF SAN FRANCISCO, CALIFORNIA.

MOWER.

1,383,066.  Specification of Letters Patent.  Patented June 28, 1921.

Application filed April 18, 1918. Serial No. 229,348.

*To all whom it may concern:*

Be it known that I, JOHN HENRY BLAIR, a citizen of the United States, residing at San Francisco, in the county of San Francisco and State of California, have invented certain new and useful Improvements in Mowers, of which the following is a specification.

This invention relates to improvements in mowers, designed to simplify the construction and to avoid some of the troubles which have heretofore existed in mowers, due to clogging of the knife, or knives. In carrying out my invention, I provide a frame of simple construction, upon the forward end of which I mount a pair of serrated knives, each of which is movable, and as an operating means for the knives, I provide a drum on the axle of the machine, having a zig-zag groove, and a pair of levers, pivotally connected to the knives and engaging diametrically opposite points on the drum, whereby, when the machine is moved forward, the levers will be rocked simultaneously in opposite directions, and both of the knives will be simultaneously moved to cut the grass, or other material.

In the accompanying drawing,

Figure 1 is a side elevation of the mower;

Fig. 2 is a top plan view of the same;

Fig. 3 is a central section on the line 3—3 of Fig. 2;

Fig. 4 is a top plan view of the forward part of the machine; and,

Fig. 5 is a section on the line 5—5 of Fig. 4.

Referring to the drawing, 1 and 2 indicate the wheels of the mower, which are mounted upon an axle 3, one or both of the wheels being keyed to the axle in order to drive the latter. The frame A of the machine comprises side bars 4 and 5, provided with cap bearings 6, engaging the axle, and a bar 7, which connects the forward ends of the side bars. The rear ends $4^a$ and $5^a$ of the side bars are bent inwardly toward one another and secured to a handle bar 8. By means of the handle bar, the machine may be moved forward or backward, or rocked about the axle, on which latter the frame is journaled.

Midway between the side bars of the frame, a drum B is secured to the axle so as to turn therewith. This drum has in its periphery a zig-zag guide groove 9. A pair of cross bars 10 and 11 are secured to the side bars 4 and 5, near the forward end of the frame and at the rear of the end bar 7. The cross bar 10 is secured to the upper side of the frame directly over the cross bar 11, which is secured to the lower side of the frame, and these bars are bent slightly away from one another, at their central portions, as shown, in order to provide a suitable space for levers 12 and 13, which extend through said space and are pivoted upon a pin or bolt 14, which extends vertically through the center of the cross bars. The lever 12 has a long arm extending rearwardly from its pivotal point and is provided with a spherical projection $12^a$, which engages the zig-zag guide groove at the top of the drum B, and the lever 13 has a long rearwardly extending arm provided with a similar projection $13^a$, which engages the said guide groove at the bottom of the drum. The arrangement is such that as the mower is moved forward, rotating the drum, the levers 12 and 13 will be swung laterally in opposite directions. The shorter arms $12^b$ and $13^b$ of the levers, which project forwardly from the pin 14, are pivotally connected to knife bars 15 and 16, respectively, which bars are movable transversely of the frame above the forward bar 7. The bar 15 has longitudinal slots $15^a$, and the bar 16 has longitudinal slots $16^a$, and guide pins 17 extend through the slots of both knife bars and through the frame A. The pivots 18 which connect the levers to the knife bars are loosely fitted in the latter in order to provide the lost motion necessary to permit of the swinging movement of the levers. As shown in Fig. 5, this lost motion is provided by suitably enlarging the openings $18^a$, in the knife bars, through which the pivots 18 extend.

The knife bar 15 slides upon the knife bar 16, and the forward ends $15^b$ and $16^b$ of the knife bars are spaced away from one another in order to make a groove or socket into which serrated knife blades 19 and 20 are fitted. The blade 19 is connected, as by rivets 21, to the knife bar 15, and the blade 20 is similarly connected to the knife bar 16. The blades lie in close contact with one another so that when the bars and blades are reciprocated simultaneously in opposite directions by the levers, the grass will be sheared.

In operation, when the machine is pushed forward, the drum will turn with the axle, and the zig-zag guide groove will cause the levers to swing simultaneously in opposite directions and this, as will be evident, will cause the knife blades to also move simultaneously and alternately in opposite directions, and the knives will cut during both movements. As the angles of the guide groove in the drum are somewhat sharp or abrupt, the knives will be reversed in their movements quickly so that there can be practically no forward movement of the machine without lateral cutting movements of the knives.

The machine described is simple in construction and operation and is not liable to clog, since both cutting edges are operated. In mowers wherein one knife is stationary, trouble often occurs from the clogging of the knives, which trouble is overcome in the present machine by having both knives movable.

What I claim is:

In a mower, the combination with an axle and a pair of supporting wheels, of a drum secured to said axle between the wheels and having a zig-zag guide groove in its periphery, a frame comprising side bars journaled upon the axle, an end bar connecting the forward ends of said side bars and upper and lower cross-bars connecting said side bars adjacent to and at the rear of said end bar, a pair of levers mounted between said cross-bars and pivoted centrally thereof, said levers having relatively long arms engaging said guide groove at the top and bottom of the drum at diametrically opposite points and shorter arms extending forwardly from the pivotal point of the levers, a pair of knife bars superposed one upon the other movable transversely of the frame over said end bar and supported thereby, said knife bars being pivotally connected to the shorter arms of the levers, and serrated blades secured to said knife bars and in sliding contact with one another.

In testimony whereof I affix my signature.

JOHN HENRY BLAIR.